March 17, 1964  T. E. LOHR ETAL  3,125,318
FOUR-WAY POWER SEAT ADJUSTER
Filed May 18, 1961  4 Sheets-Sheet 3

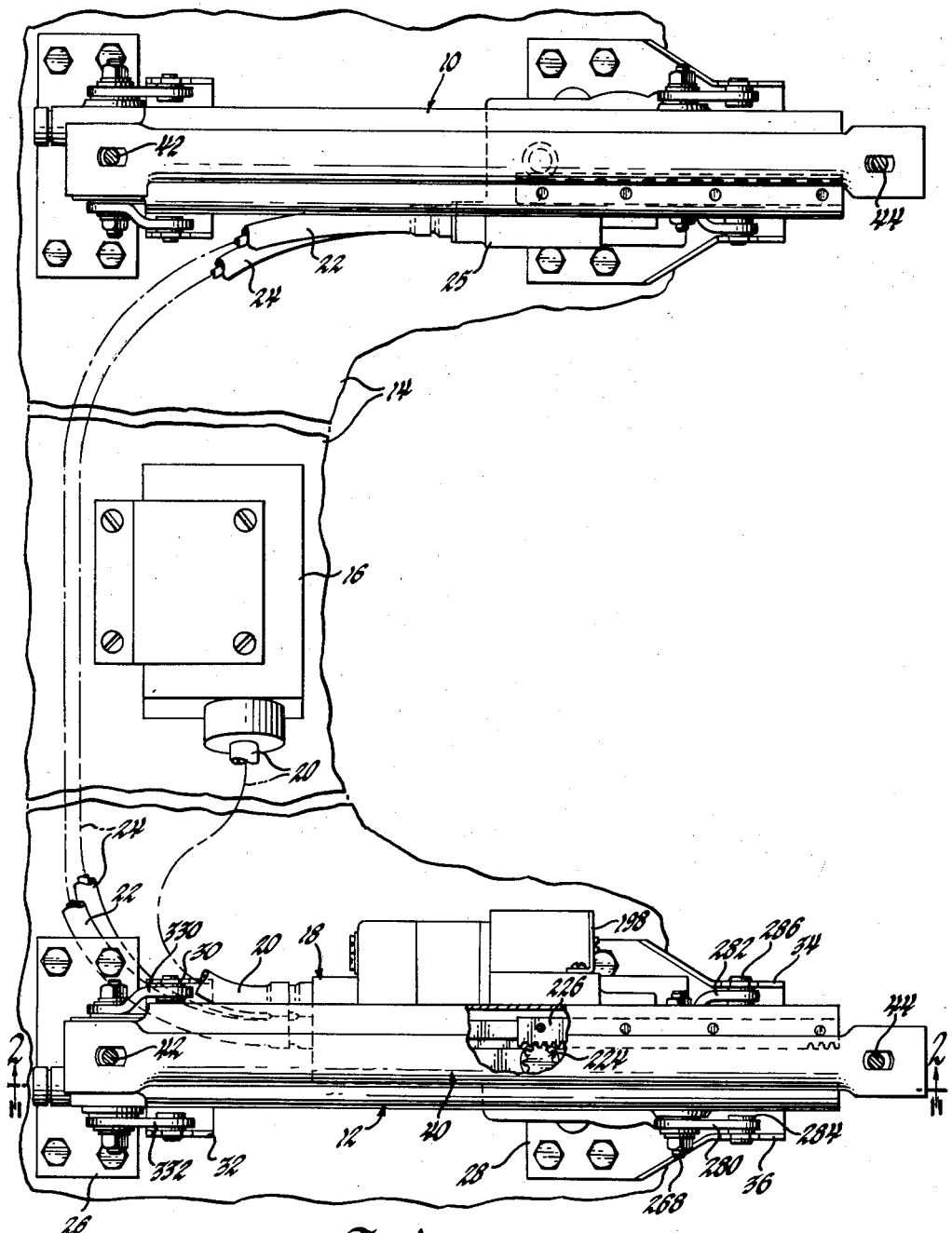

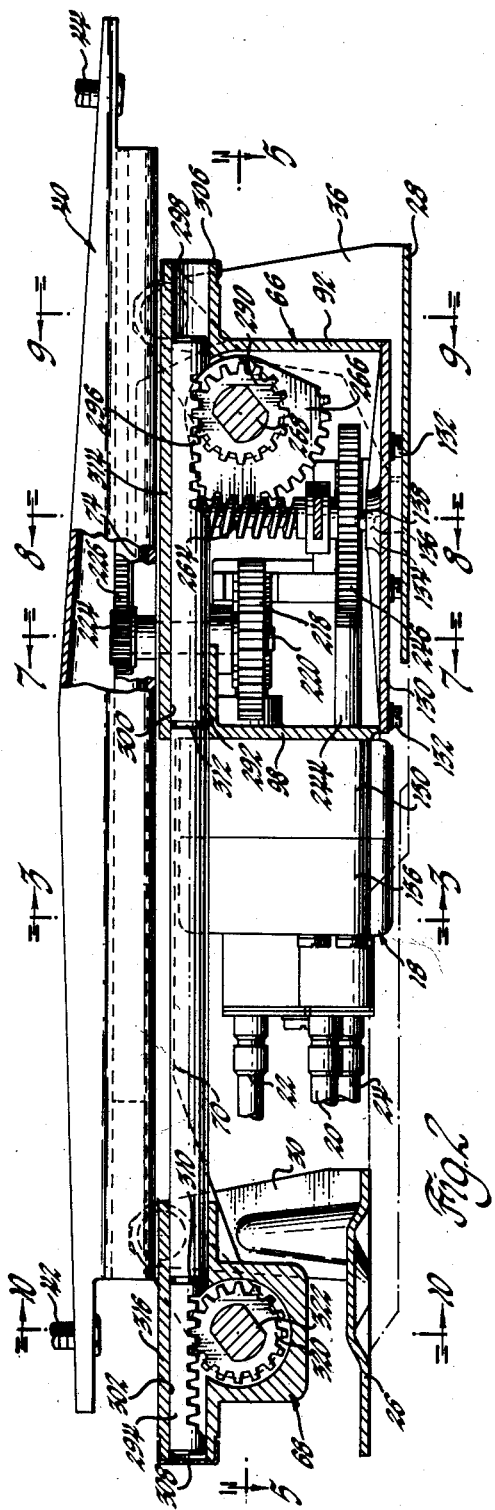

INVENTOR.
Thomas E. Lohr &
BY Harold P. Selleck

Bruce G. Klaas
ATTORNEY

March 17, 1964
T. E. LOHR ETAL
3,125,318
FOUR-WAY POWER SEAT ADJUSTER
Filed May 18, 1961
4 Sheets-Sheet 4
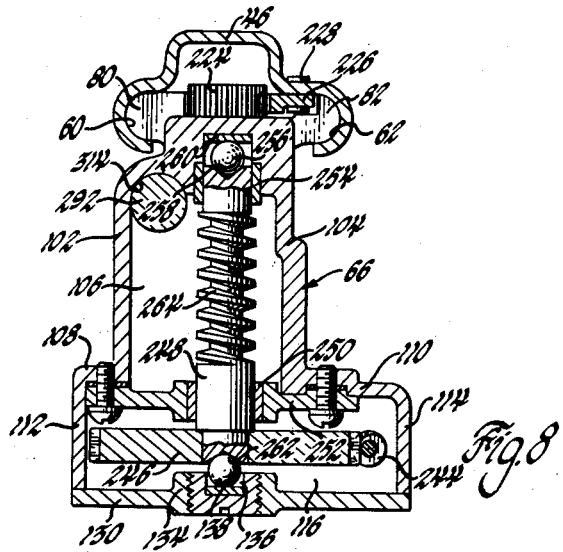
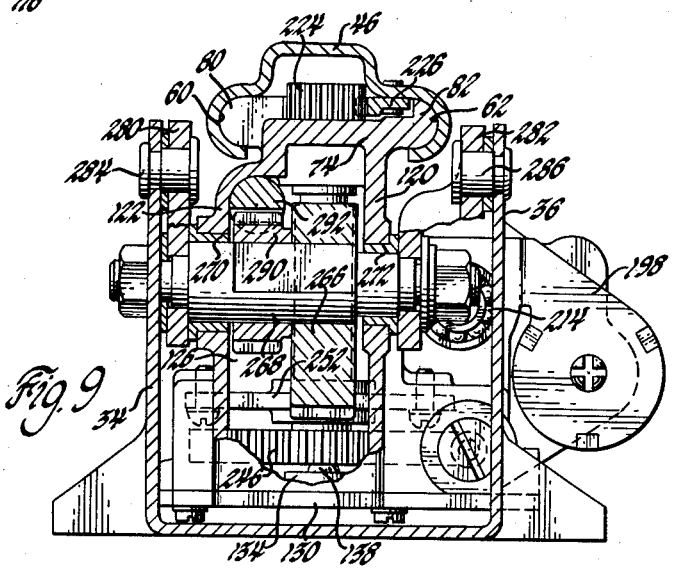
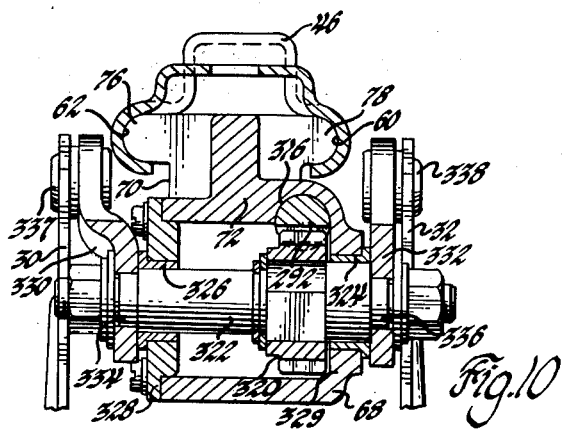
INVENTOR.
Thomas E. Lohr &
BY Harold P. Selleck
ATTORNEY

United States Patent Office 3,125,318
Patented Mar. 17, 1964

3,125,318
FOUR-WAY POWER SEAT ADJUSTER
Thomas E. Lohr and Harold P. Selleck, both of Detroit, Mich., assignors to General Motors Corporation, Detroit, Mich., a corporation of Delaware
Filed May 18, 1961, Ser. No. 110,968
5 Claims. (Cl. 248—419)

This invention relates to seat adjuster apparatus and, more particularly, to adjuster apparatus for effectuating horizontal and vertical movement of a vehicle seat.

Vehicle seat adjuster apparatus conventionally comprises a pair of spaced adjuster assemblies to which a vehicle seat is secured for horizontal and vertical adjustment. A variety of power means have previously been provided to actuate the adjuster units in unison. In general, the seat adjuster units comprise a pair of relatively movable horizontally positioned channel members which are slidably engaged to form a track and vertical linkage positioned between the floor and the channel members or the seat and the channel members. In modern automobiles, severe space limitations have required that seat adjuster structure be made more compact. Power seat adjusters are currently actuated by electric motor means which are controllable by solenoid clutch mechanism. A common arrangement is to mount electric motors and clutch mechanism in a unit located beneath the seat between the spaced adjuster units. The most economical arrangement is to provide a single electric motor which is clutchably connectable to various actuating mechanisms of the adjuster units. It has been previously proposed to utilize flexible drive cables which require a minimum of space beneath the vehicle seat and which may be readily positioned between the electric motors and the adjuster units. The seat adjuster actuating mechanisms have commonly been mounted on the channel members of the seat adjuster units and supported thereby in an exposed condition. In this manner, the actuating mechanism has been subject to the deteriorating effects of dirt and other materials which are likely to collect beneath the vehicle seat and be deposited on the actuating mechanism itself. Accumulations of dirt and debris on the actuating mechanism can seriously interfere with the proper functioning thereof. In addition, the attachment and support of the actuating mechanism in an open manner between or adjacent to the seat adjuster track mechanism has resulted in an unsightly and cumbersome arrangement of parts requiring additional space beneath the vehicle seat.

The object of this invention is to provide an improved seat adjuster unit having housing means to enclose the adjuster actuating mechanism. Another object of this invention is to provide new and improved horizontal track means for a seat adjuster including an integral drive mechanism housing. Still another object of this invention is to provide a new and improved arrangement of drive mechanism within an enclosing housing. A further object of this invention is to provide a seat adjuster unit of more sturdy construction which is more reliable in use.

Other objects and advantages of this invention are disclosed in or will be readily apparent from the following detailed description wherein reference is made to the accompanying drawing on which:

FIGURE 1 is a plan view, partly in section, of apparatus embodying the present invention;

FIGURE 2 is a side elevational view, partly in section, taken along the line 2—2 in FIGURE 1;

FIGURE 3 is a sectional view taken along the line 3—3 in FIGURE 2;

FIGURE 4 is a sectional view taken along the line 4—4 in FIGURE 3;

FIGURE 8 is a sectional view taken along the line 8—8 in FIGURE 2;

FIGURE 9 is a sectional view taken along the line 9—9 in FIGURE 2; and

FIGURE 10 is a sectional view taken along the line 10—10 in FIGURE 2.

Figure 5:
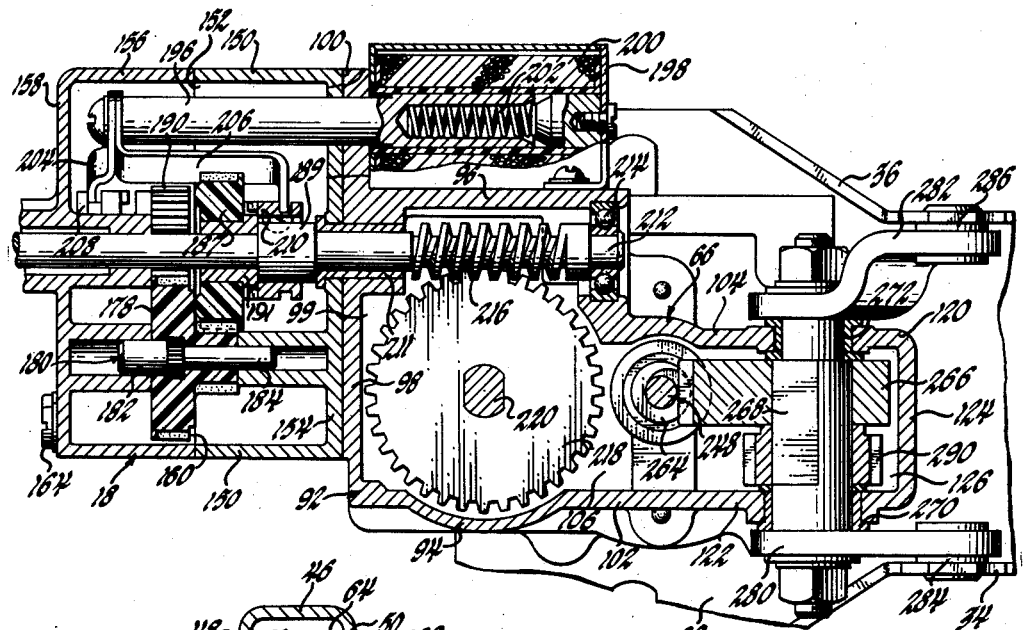
FIGURE 5 is a sectional view taken along the line 5—5 in FIGURE 2.

Referring now to FIGURE 1, the illustrative embodiment of the present invention is depicted in connection with a pair of spaced seat adjuster assemblies or units 10, 12 which are parallelly aligned to one another and secured to a vehicle floor 14 or the like in any suitable manner. A reversible electric motor 16 may be mounted in any convenient position and is connected to clutch mechanism 18 by a flexible cable 20. The flexible cable 20 is connected to actuating mechanism of the unit 12 in a manner to be hereinafter described and the adjuster unit 10 is correspondingly actuated by a pair of flexible cables 22, 24 which are connected to actuating mechanism in a housing 25. The subject seat adjuster units are adapted to effectuate fore and aft adjustment of a seat element supported thereon and to additionally effectuate vertical adjustment thereof. The seat adjuster units are substantially identical, except insofar as the arrangement of the clutch mechanism 18 and the connection of the cables 22, 24 is concerned. Accordingly, only the adjuster unit 12 will be described in detail and it is to be understood that similar corresponding mechanism is provided in the adjuster unit 10.

Referring now to FIGURES 2-10, the adjuster unit 12 is shown to comprise a front support element 26 and a rear support element 28. Each of the support elements is provided with a substantially flat bottom portion that is adapted to be secured to the vehicle floor and a pair of parallel upwardly extending side portions 30, 32, and 34, 36. A seat support member 40 having a channel shaped cross sectional configuration is provided with bolts 42, 44 which are provided to secure a vehicle seat thereon. As shown in FIGURES 7-10, the seat support comprises an upper web portion 46 having downwardly extending sides 48, 50 which are outwardly bent to provide substantially horizontal portions 52, 54. The ends of the sides are inwardly curved at 56, 58 to provide substantially arcuate inner surfaces 60, 62. The hat-shape cross sectional configuration thus provided forms an upper chamber 64 above the arcuate slide surfaces 60, 62 to accommodate portions of the drive mechanism as hereinafter described.

The seat support member 40 is slidably mounted on a trackway integrally formed on the top of housing means provided for the adjuster actuating mechanism.

Referring now to FIGURE 2, the integral track and housing unit comprises a main housing portion 66, a forwardly spaced housing unit 68, an interconnecting longitudinally extending support arm 70. A pair of spaced guide rail means 72, 74 are integrally formed on and extend upwardly from the support arm 70 and the main housing 66 respectively. As shown in FIGURES 7-10, the guide rail means 72, 74 are T-shaped in cross section and have outwardly extending guide rail portions 76, 78 and 80, 82 which terminate in arcuate surfaces corresponding to the arcuate surfaces 60, 62 on the seat support member 36. One of the outwardly extending portions 82 is provided with a longitudinal slot 84 which opens along the upper surface of the guide rail means 74 for a purpose to be hereinafter described. A bore 86 and a counterbore 88 which provides a seat 90 are centrally located in the guide rail means 74 and extend vertically from the top surface thereof into the interior of the main housing 66.

Referring now to FIGURE 5, the main housing 66 comprises a downwardly extending side wall or rim portion 92 which is continuous and defined, in part, by downwardly extending side wall portions 94, 96 at the front of the main housing and a front side wall portion 98 having an outwardly directed flange portion 100. The wall portions 94, 96, 98 define a cavity 99. The central portion of the main housing is provided with side wall portions 102, 104 that define an upper cavity 106 and which terminate in outwardly directed portions 108, 110 as shown in FIGURE 8. Additional vertical side wall portions 112, 114 extend downwardly from the portions 108, 110 to define a lower enlarged cavity 116. The rear portion of the main housing comprises side wall portions 120, 122 and an end wall portion 124 which define a cavity 126. A cover plate 130 having a contour corresponding to the lower opening defined by the rim 92 is secured by a plurality of bolts or the like 132 to completely seal the main housing. As shown in FIGURE 2, the cover is provided with a centrally located upwardly extending boss 134 having a conical seat 136 in which a ball bearing 138 is received.

Figure 6:
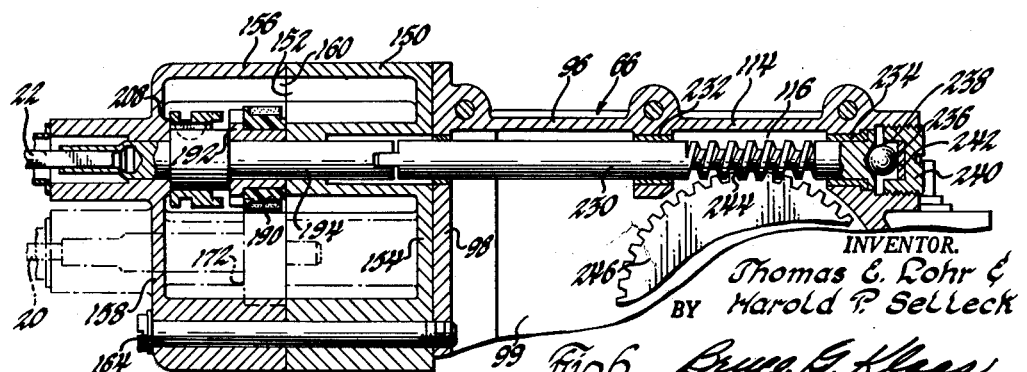
FIGURE 6 is a sectional view taken along the line 6—6 in FIGURE 3.

Referring now to FIGURES 1–7 and, particularly, to FIGURES 3–6, the clutch unit 18 is mounted on the front wall 98 of the main housing 66 and located beneath the seat support channel 40. The clutch unit comprises a first cup-shaped unit 150 having an open end 152 and a rear wall 154 which abuts the side wall 98 of the main housing. The clutch unit is completed by a cover portion 156 which comprises a front wall 158 and a rearwardly facing opening 160. The clutch housing portions 150, 156 are secured to one another and to the face of the wall 98 of the main housing by a plurality of bolts 164 as shown in FIGURE 6.

Figure 7:
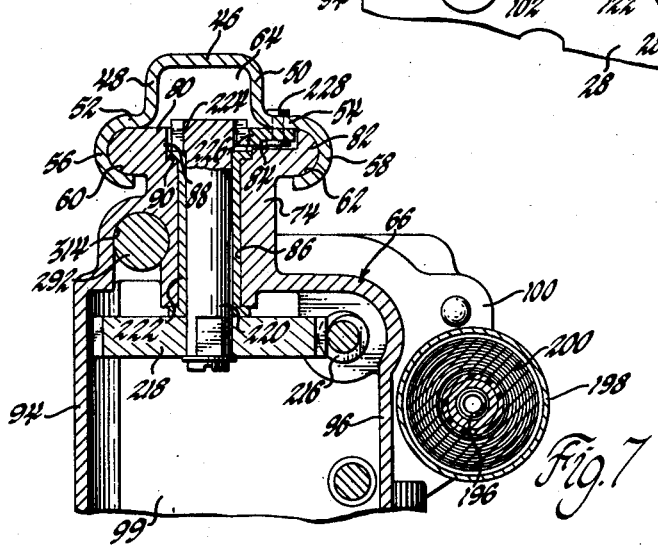
FIGURE 7 is a sectional view taken along the line 7—7 in FIGURE 2.

Referring now to FIGURE 4, the flexible drive cable 20 extends into the clutch housing through an opening 166 in a forwardly projecting boss 168. The flexible cable 20 is connected to a shaft element 170. A pinion 172 is mounted on the shaft 170 adjacent the end portion 174 which is rotatably mounted in a forwardly extending boss 176 of the clutch housing portion 150. The pinion 172 is drivingly engaged with first portion 178 of a stepped gear which is rotatably mounted on a shaft 180. The end portions 182, 184 of the shaft 180 are rotatably mounted in bearing bosses 186, 188, respectively. Referring now to FIGURES 3 and 5, a pinion 185 is formed integral with the gear 178 and is drivingly engaged with a gear 187 which is mounted on a clutch sleeve 191 rotatably supported on a shaft 189. The drive gear 172 is additionally drivingly engaged with a gear 190 which is mounted on a clutch sleeve 192 rotatably supported on a shaft 194. A clutch rod 196 is reciprocably mounted within the clutch housing and extends through the abutting side walls 98, 154. A solenoid housing 198 is secured in abutting engagement with the side wall 96 of the main housing and the outwardly extending flange 100. The end of the clutch bar 196 extends within the winding 200 of the solenoid and forms an armature which is biased by a spring 202 to a normally outwardly extending position. Actuating dogs 204, 206 are secured to the ends of the clutch rod 196 and engage clutch elements 208 and 210, respectively. The clutch element 208 is keyed to the shaft 194 and slidably movable therealong into driving engagement with the clutch sleeve 192 to transmit power from the gear 190 to the shaft 194. The clutch element 210 is slidably keyed to drive shaft 189 and slidably moveable therealong into driving engagement with the clutch sleeve 191 to transmit power from the gear 187 to the drive shaft 189. The shaft 189 is rotatably supported in a bushing 211 extending between the rear wall 154 of the clutch housing and the front wall 98 of the main housing unit. The rearward end 212 of the shaft 189 is rotatably secured in a bearing unit 214 fixably mounted in the main housing 92. A drive worm 216 is provided on the shaft 189 within the main housing and is drivingly engaged with a worm gear 218 mounted on a vertical shaft 220. As shown in FIGURE 7, the vertical shaft 220 is rotatably mounted in a bushing 222 which extends upwardly through the bearing hole 86 and is seated at the other end on the seat 90. A drive pinion 224 is secured to the other end of the shaft 220 and is supported by a radially extending flange of the bushing 222 and the seat 90. The drive gear 224 is drivingly engaged with a longitudinally extending rack element 226 which is fixably secured by rivets 228 or other suitable means to the horizontal portion 54 of the upper channel member and is located within the longitudinally extending slot 84.

Referring now to FIGURES 6 and 8, the drive shaft 194 is connected to a drive shaft 230 which is rotatably mounted in the main housing by spaced bearing sleeves 232, 234. The end of the drive shaft 230 is rotatably supported on a thrust bearing ball 236 secured within a conical groove 238 on the end of the shaft by a plug member 240 which has a bearing plate 242 provided along the bottom surface thereof. A worm 244 is provided on the drive shaft 230 and drivingly engages a worm gear 246 fixed to a vertically extending shaft 248 which is rotatably supported in a bearing sleeve 250 mounted in a support plate 252. The upper end of the shaft 248 is supported within a bearing sleeve 254 and abuts a ball bearing 256 which is seated in a conical groove 258 and abuts a bearing plate 260. The other end of the drive shaft 248 is provided with a similar conical seat 262 which abuts the ball bearing 138. Referring now to FIGURES 2 and 5, worm 264 is provided intermediate the ends of the shaft 248 and is drivingly engaged with a sector element 266 fixably secured to a horizontal drive shaft 268. The drive shaft 268 is rotatably mounted in bearing sleeves 270, 272 and extends outwardly through the side walls 120, 122 of the main housing. The ends of the shaft 268 are fixably secured to one end of drive linkage elements 280, 282. The other ends of the drive linkage elements are pivotally secured at 284, 286 to the side flanges 34, 36 of the rear support.

Referring now to FIGURES 2 and 9, a drive gear 290 is fixably secured to the horizontal shaft 268 within the housing 92 and is drivingly engaged with a rack element 292 in the form of a shaft having spaced rack portions 294, 296. The shaft 292 is slidably mounted in spaced longitudinal bores 298, 300 in the main housing 92 and within a longitudinal bore 302 in the front housing unit 68. Cap elements 306, 308 enclose the ends of the bores 298 and 302 respectively, and sealing ring grooves 310, 312 are provided in the shaft 292 to accommodate conventional sealing means, such as O rings which seal the other ends of the bore 300 and the bore 302. The upper surfaces of the main housing 92 and the front housing 68 are provided with arcuate seats 314, 316 which slidably receive the upper surface of the rod 292 to control sliding movement thereof. The front rack portion 294 of the rod is drivingly engaged with a gear 320 fixably mounted on a horizontal drive shaft 322. As illustrated in FIGURE 10, the horizontal drive shaft 322 is rotatably mounted in bearing sleeves 324, 326 and extends outwardly through a cover plate 328 and a side wall 329 of the forward housing. Drive linkage elements 330, 332 are fixably secured at 334, 336, respectively, to the ends of the drive shaft 322. The other ends of the drive links 330, 332 are pivotally secured at 337, 338 to the side walls 30, 32 of the front support.

*Operation*

In operation, the seat unit may be adjusted fore and aft by actuation of the motor means 16 to drive the flexible cable 20, the shaft 170, the gear 172, and the gears 178, 185. The gear 185 is drivingly engaged with the gear 187 at all times. When the solenoid 198 is deenergized and the clutch rod 196 is in its extreme forward position, the clutch element 210 which is keyed to the drive shaft 189 meshes with the mating clutch sleeve 191 thus transmitting power from gear 185 to drive shaft 189. Rotation of the drive shaft 189 drives the worm gear 218 through the worm 216 to actuate the pinion 224 on the vertical shaft 220. The pinion 224 is engaged with the rack teeth on the rack element 226 and drives the upper seat supporting element 46 fore and aft on the guide bearings 80, 82 of the rear support housing and the guide bearings 76, 78 of the front housing 68. By reversing the motor, the seat may be driven forwardly or rearwardly. Corresponding motion is transmitted from the left-hand adjuster unit 12 to the right-hand adjuster unit 10 through the flexible cable 24 which is secured to the end of the shaft 189.

In order to obtain vertical adjustment of the seat, the motor 16 is energized as before to drive the flexible cable 20 and the pinion 172 through the drive shaft 170. The pinion 172 is drivingly engaged with the gear 190 on the shaft 194. Actuation of the solenoid 198 retracts the rod 196 against the bias of the compression spring 202 to move the clutch element 208 into engagement with the clutch sleeve 192 and to cause disengagement of the clutch element 210 from the clutch sleeve 191. The clutch element 208 is keyed to the shaft 194 and causes rotation thereof through the gear 190. The shaft 194 is connected to the shaft 230 and drives the worm gear 246 through the worm 244. The vertical shaft 248 is rotatably actuated on the ball bearings 138, 256 within the bearing sleeve 250. The worm 264 formed on the shaft 248 drives the sector gear 266 in a vertical swinging motion to cause rotative displacement of the horizontal shaft 268. The drive linkages 280, 282 are fixably secured to the ends of the drive shaft 268 and are pivotally displaced thereby. Since the other ends of the drive links 280, 282 are pivotally secured at 284, 286, respectively, to the rear support and fixably restrained relative to the vehicle floor, rotation of the drive shaft 268 causes the entire drive mechanism housing and seat support element to be vertically displaced. In order to obtain simultaneous corresponding movement at the front of the vehicle seat, the drive gear 290 simultaneously actuates the shaft 292 through the rack teeth 296. Movement of the shaft causes the gear 320 located in the front housing 68 to be rotated by the rack teeth 294. In this manner, the front horizontal drive shaft 322 is rotated within the bearing sleeves 324, 326 to cause displacement of the drive linkages 330, 332 which are fixable secured to the ends of the drive shaft 322. Since the other ends of the drive links are pivotally secured to the fixed support arms 30, 32, the front housing unit is equally vertically displaced relative to the rear housing unit. Simultaneous corresponding movement is obtained in the right-hand adjuster 10 through the flexible drive cable 22 which is secured to the end of the drive shaft 194 and connects at the other end with identical drive mechanism.

The invention claimed is:

1. In a seat adjuster unit having a seat supporting channel member, support means fixedly mounted to a supporting structure and being adapted to movably support said channel member, slide groove means formed in said channel member, track means having guide portions adapted to be received and slidably retained within said groove means for fore and aft adjustment of said channel member, linkage means connected between said track means and said support means for vertical displacement of said channel member, independent drive mechanism for effectuating fore and aft adjustment and vertical displacement of said seat supporting channel member, a drive mechanism housing integrally formed with said track means beneath said guide portions to provide an enclosure for said drive mechanism, cover means and seal means associated with said drive mechanism housing to completely enclose said drive mechanism, motor means, power transfer means connecting said motor means and said drive mechanism, and said power transfer means extending through said housing beneath said guide portions in a position substantially parallel to the channel member and the path of movement thereof during fore and aft adjustment.

2. In a seat adjuster unit for effectuating fore and aft adjustment and vertical displacement of a seat, an upper longitudinally extending seat support channel, spaced vertical linkage means located at the front and rear of said adjuster unit and being pivotally connected to support means fixed relative to said support channel, an integral track element and drive unit housing comprising spaced housing portions and a contiguous support extending therebetween, T-shaped guide means formed on the upper surface of said integral track element and drive unit housing, said seat support channel being slidably received and retained on said guide means, one of said housing portions containing vertical drive mechanism for one of said spaced vertical linkage means, the other of said housing portions containing vertical drive mechanism for the other of said vertical linkage means, each vertical drive mechanism comprising a drive shaft rotatably horizontally supported within the associated housing portions and having end portions extending outwardly from said housing portion, said linkage means being controllably connected to said end portions for pivotal actuation thereby, drive means located within said one housing operably connected to the drive shaft therein to cause rotation thereof and pivotal actuation of the associated vertical linkage to vertically adjust said seat by vertical displacement of said integral housing track element relative to said support means, gear means mounted on each of the drive shafts and power transfer means connected to said gear means and extending between said housings to cause corresponding vertical actuation of the other vertical linkage means when said one vertical linkage means is being actuated.

3. The apparatus as defined in claim 2 and wherein said power transfer means comprises a shaft slidably mounted in each of said housing portions and extending therebetween, rack means provided on said shaft for driving engagement with said gear means to effectuate equal vertical displacement of said vertical linkage means, and sealing means associated between said shaft and said housings to prevent the entry of foreign matter into said housings.

4. In a seat adjuster unit, a seat support channel having a web end and downwardly extending sides, said sides each comprising a downwardly extending portion, an outwardly extending portion and an inwardly curved portion, said outwardly extending portions being substantially parallel to said web, each of said inwardly curved portions defining an arcuate seat, a track member having a T-shaped cross section to define a central support portion and outwardly spaced guide portions, said guide portions having arcuate ends corresponding to said arcuate seat and adapted to slidably receive said seat support channel, said guide portions being received and retained within said inwardly curved portions and said outwardly extending portions being slidably and supportingly engaged with the top surface of the central support portion adjacent said guide portions, a longitudinally extending rack recess formed in said track member and opening outwardly between one of said outwardly extending positions and the adjacent outwardly spaced guide portion, a rack element fixed to said seat support channel and extending longitudinally within said recess and over said central support portion so that a side surface of said rack element is vertically aligned inwardly of the adjacent extending side of said seat support channel and located beneath said web, rack teeth formed along said side surface of said rack element, a vertically extending drive port provided in said central support portion, a gear seat recess formed in the upper surface of said central support portion and intersecting said rack recess, a drive gear rotatably mounted in said gear seat recess and drivingly engaged with the rack teeth of said rack element, and drive means connected to said drive gear through said drive port to effectuate horizontal sliding movement of said seat support channel relative to said track member.

5. The apparatus as defined in claim 2 and wherein said rear housing portion comprises a front wall portion extending transversely to the path of movement of said upper seat support channel during horizontal adjustment, a clutch means housing fixably secured to said front wall portion, said clutch housing having a side surface extending parallel to and spaced downwardly from said front wall portion of said rear housing, and flexible cable means extending through said side surface of said clutch housing substantially parallel to the path of movement of said seat support channel, and clutch mechanism movable longitudinally of said seat adjuster unit to connect said drive cable means with drive mechanism located in said rear housing.

References Cited in the file of this patent

UNITED STATES PATENTS

| | | |
|---|---|---|
| 2,809,689 | Garvey | Oct. 15, 1957 |
| 2,886,094 | Pickles | May 12, 1959 |
| 2,929,439 | Tanaka | Mar. 22, 1960 |

UNITED STATES PATENT OFFICE
CERTIFICATE OF CORRECTION

Patent No. 3,125,318                          March 17, 1964

Thomas E. Lohr et al.

It is hereby certified that error appears in the above numbered patent requiring correction and that the said Letters Patent should read as corrected below.

Column 6, line 13, for "contiguous" read -- continuous --.

Signed and sealed this 21st day of July 1964.

(SEAL)

Attest:

ESTON G. JOHNSON
Attesting Officer

EDWARD J. BRENNER
Commissioner of Patents